Sept. 25, 1923.
M. R. JACOBUS
POULTRY FEEDER
Filed Nov. 13, 1920
1,469,013
2 Sheets-Sheet 1
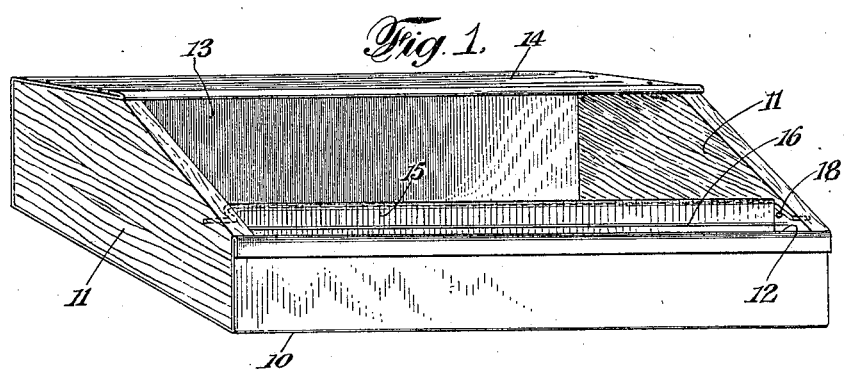
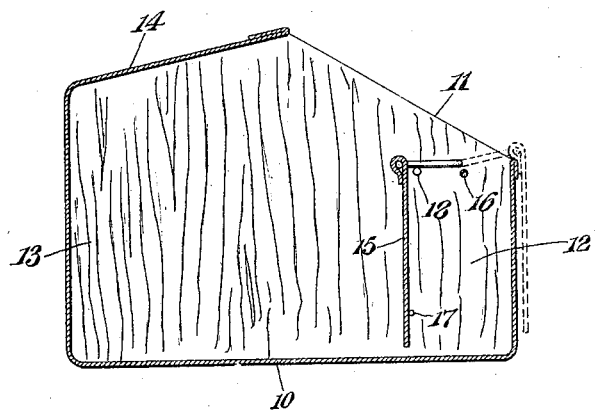
INVENTOR
Martin R. Jacobus
BY
ATTORNEY Sept. 25, 1923. 1,469,013
M. R. JACOBUS
POULTRY FEEDER
Filed Nov. 13, 1920 2 Sheets-Sheet 2
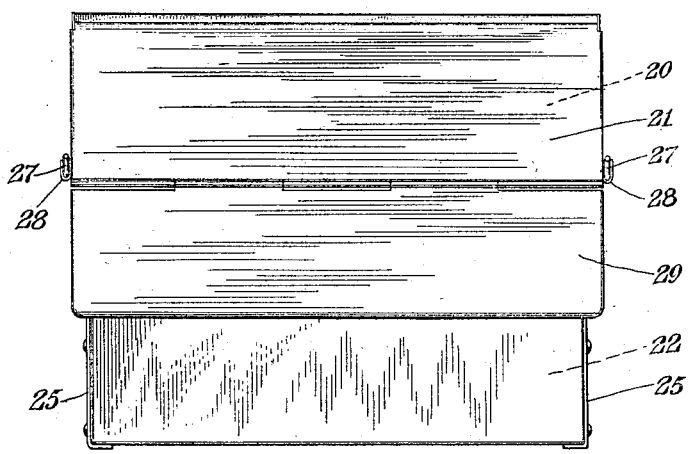
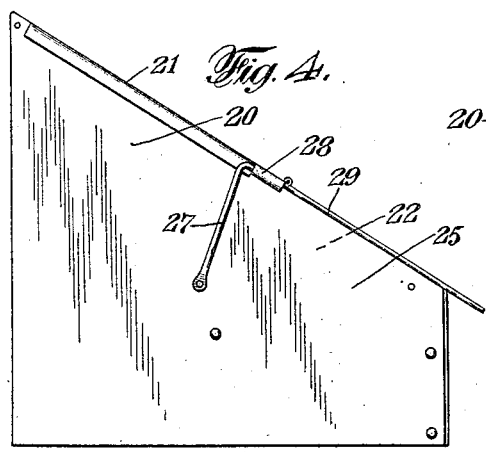 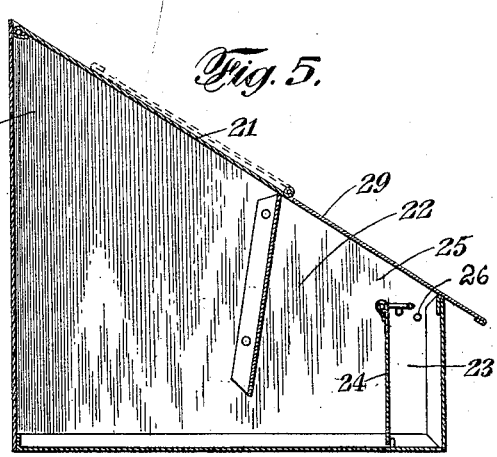
INVENTOR
Martin R. Jacobus
BY
ATTORNEY Patented Sept. 25, 1923.

1,469,013

UNITED STATES PATENT OFFICE.

MARTIN R. JACOBUS, OF RIDGEFIELD, NEW JERSEY.

POULTRY FEEDER.

Application filed November 13, 1920. Serial No. 423,820.

*To all whom it may concern:*

Be it known that I, MARTIN R. JACOBUS, a citizen of the United States, and a resident of Ridgefield, in the county of Bergen and State of New Jersey, have invented certain new and useful Improvements in Poultry Feeders, of which the following is a specification.

The invention relates to a feeder for stock as poultry and the like; and it has for its object to construct a feeder wherein the feed scattered is caught and retained in a suitable receptacle, thereby preventing waste and the eating of soiled food. It has for a further object to afford a convenient return of feed thus collected to the main supply or receptacle; and, if desired, to secure, also, the feeder against vermin during the period that it is not in use.

The nature of the invention will best be understood when described in connection with the accompanying drawings, in which—

Fig. 1 is a perspective view and Fig. 2 a vertical section thru the improved feeder. Fig. 3 is a front elevation, Fig. 4 an end view and Fig. 5 a vertical section illustrating another form.

Similar characters of reference designate corresponding parts thruout the several views.

Referring to Fig. 1 of the drawings, 10 designates a receptacle of the desired capacity, having end barriers 11 to provide a waste feed trough or receptacle 12 behind which is a food compartment or receptacle 13, which is preferably covered over the top by a wall 14. The wast feed trough and food compartment are separated from each other by a swinging or pivotally mounted wall 15, extending substantially to the bottom of the receptacle. This wall may be pivoted in any convenient manner to the end barriers 11; and it is preferred, furthermore, to arrange the wall to swing about on axis passing thru its upper edge which is offset with reference to the axis of the pivots, thus mounting the wall eccentrically to permit same to be swung outwardly, for example, over the front, as indicated in dotted lines, Fig. 2. This will allow of free access being had to the interior of the receptacle for filling or cleaning purposes.

In operation, the fowl feed out of the food compartment 13 in the rear part of the feeder, any food which is dropped or spilled by them being caught by the waste receptacle 12. Access to the latter is prevented by means of a wire 16 or suitable grating extending over same, sufficient opening only to receive the scattered feed being provided therein. When the proper quantity has been collected in the waste trough, the same may be readily returned to the feeding receptacle of the feeder by swinging the wall 15 about the axis thru its upper edge and correspondingly turning or partly inverting the entire feeder. The forward movement of the lower portion of wall 15 may be restricted by suitable stops 17 and the downward movement of the wall about its pivots by stops 18, it being understood that the wall as a whole is free to oscillate backwardly about its upper edge as an axis.

In the form disclosed in Figs. 3 to 5, 20 designates a hopper or feed reservoir provided at the top with a hinged lid or cover 21, said hopper being open at the bottom and terminating in a feed receptacle 22 in front of same. The forward wall of the hopper is preferably rearwardly directed to form a downwardly tapering hopper and the feed is designed to be taken by the fowl from the receptacle 22 over a waste feed trough or receptacle 23 which is designed to catch the feed thrown or dropped in eating from said feed receptacle 22. The waste feed receptacle is provided in manner similar to that shown in Figs. 1 and 2, with a wall 24 which is pivotally mounted, as set forth in connection with said wall 15, between the end barriers 25 and the feed and waste receptacles. Ordinarily, the waste feed trough will be made sufficiently narrow to prevent feeding therefrom; or, a rod 26 may be placed thereover to prevent access to its contents. When sufficiently filled, the feed may be returned to the feed receptacle 22 by swinging the wall 24 about its upper edge as an axis.

The lid or cover 21 may be held to the receptacle by means of suitable hooks 27 pivoted to the end barriers and designed to fit over turned-up ears 28 extending laterally from said lid. It is also preferred to further extend the lid or cover 21 by providing a hinged extension 29 thereto which, when the feeder is in operation, is swung back on top of the lid 21, as indicated in dotted lines, Fig. 5; but when it is desired to seal the entire feeder, as against vermin, may be brought down over both the feed receptacle and the waste feed trough, as shown in full lines.

I claim:—

1. A poultry feeder, comprising two adjacent, normally non-communicating receptacles, including a forward or waste trough over which access is had to the other or feed receptacle, said trough being designed to receive the scattered feed taken from the feed receptacle, and a separating wall pivotally secured to the feeder, oscillatable about its upper edge which is displaced from the pivotal axis, whereby said wall may be rotated as a whole about the pivotal axis to assume a position outside of the feeder.

2. A poultry feeder, comprising two adjacent, normally non-communicating receptacles, including a forward or waste trough over which access is had to the other or feed receptacle, said trough being designed to receive the scattered feed taken from the feed receptacle, a separating wall pivotally secured to the feeder, oscillatable about its upper edge which is displaced from the pivotal axis, whereby said wall may be rotated as a whole about the pivotal axis to assume a position outside of the feeder, and means to limit the downward movement of the wall.

3. A poultry feeder, comprising two adjacent, normally non-communicating receptacles, including a forward or waste trough over which access is had to the other or feed receptacle, said trough being designed to receive the scattered feed taken from the feed receptacle, arms secured to the feeder, a separating wall oscillatable at the end thereof, and stops to limit the movement of the arms to position the walls.

Signed at New York in the county of New York and State of New York this 12th day of November A. D. 1920.

MARTIN R. JACOBUS.